(12) United States Patent
Dobbelaar et al.

(10) Patent No.: US 8,851,500 B2
(45) Date of Patent: Oct. 7, 2014

(54) TRAILER FOR A TRAILER TRUCK

(75) Inventors: Jos Robertus Leonardus Dobbelaar, Landhorst (NL); Johannes Gijsbertus Geradus Van De Ven, Steensel (NL)

(73) Assignee: Transport Industry Development Centre B.V. (NL)

( * ) Notice: Subject to any disclaimer, the term of this patent is extended or adjusted under 35 U.S.C. 154(b) by 0 days.

(21) Appl. No.: 14/008,284

(22) PCT Filed: Dec. 21, 2011

(86) PCT No.: PCT/NL2011/050876
§ 371 (c)(1),
(2), (4) Date: Dec. 4, 2013

(87) PCT Pub. No.: WO2012/150860
PCT Pub. Date: Nov. 8, 2012

(65) Prior Publication Data
US 2014/0145414 A1    May 29, 2014

(51) Int. Cl.
| | | |
|---|---|---|
| *B60G 7/00* | (2006.01) | |
| *B60G 3/18* | (2006.01) | |
| *B62D 13/00* | (2006.01) | |
| *B62D 13/04* | (2006.01) | |
| *B60G 3/20* | (2006.01) | |
| *B60G 7/02* | (2006.01) | |

(52) U.S. Cl.
CPC .......... *B62D 13/04* (2013.01); *B60G 2200/141* (2013.01); *B60G 2200/44* (2013.01); *B60G 2300/042* (2013.01); *B60G 3/20* (2013.01); *B60G 7/02* (2013.01); *B60G 2206/124* (2013.01); *B60G 2204/143* (2013.01)
USPC ............. 280/419; 280/124.135; 280/124.145; 280/124.153

(58) Field of Classification Search
CPC ...... B62D 13/00; B62D 13/005; B62D 13/02; B62D 13/04; B62D 53/06; B60G 5/00; B60G 7/00; B60G 9/00
USPC ...................... 180/24; 280/124.116, 124.128, 280/124.134, 124.135, 124.145, 124.148, 280/124.15, 124.153, 407.1, 419, 423.1, 280/424, 426, 442
See application file for complete search history.

(56) References Cited

U.S. PATENT DOCUMENTS

| | | | |
|---|---|---|---|
| 3,278,196 A | 10/1966 | Van Winsen | |
| 4,207,956 A * | 6/1980 | McColl | ............................ 180/24 |

(Continued)

FOREIGN PATENT DOCUMENTS

| | | |
|---|---|---|
| DE | 19710138 A1 | 10/1997 |
| EP | 1985474 A2 | 10/2008 |
| FR | 1264109 A | 6/1961 |

OTHER PUBLICATIONS
International Search Report dated Apr. 4, 2012 for International Application No. PCT/NL2011/050876.

*Primary Examiner* — Joseph M Rocca
*Assistant Examiner* — Marc A Scharich
(74) *Attorney, Agent, or Firm* — Shumaker, Loop & Kendrick, LLP

(57) ABSTRACT

A trailer for a trailer truck, comprising a chassis provided with a central chassis element and at least one axle with independent wheel suspension, which is connected to the chassis, the wheel suspension comprising a first, lower wheel suspension arm that is pivotally connected to the chassis about a first pivot axis that extends substantially in the longitudinal direction of the chassis, a second, higher wheel suspension arm that is pivotally connected to the chassis about a second pivot axis, a steering knuckle connecting the first wheel suspension arm and the second wheel suspension arm, a wheel axle attached to the steering knuckle, on which a wheel is rotatably mounted. The second pivot axis extends substantially in the transverse direction of the chassis, with the second end of the second wheel suspension being spaced from the first end of the second wheel suspension arm, seen in the longitudinal direction of the chassis.

11 Claims, 3 Drawing Sheets

(56) References Cited

U.S. PATENT DOCUMENTS

| | | | |
|---|---|---|---|
| 4,991,867 A * | 2/1991 | Washizu et al. | 280/124.144 |
| 5,513,874 A * | 5/1996 | Mori | 280/93.51 |
| 6,000,706 A * | 12/1999 | Boberg et al. | 280/124.135 |
| 6,488,114 B1 * | 12/2002 | McMahon et al. | 180/414 |
| 7,401,797 B2 * | 7/2008 | Cho | 280/124.128 |
| 7,559,403 B2 * | 7/2009 | Schmitz | 180/344 |
| 7,896,372 B2 * | 3/2011 | Yanagida | 280/124.135 |
| 8,167,325 B2 * | 5/2012 | Lee et al. | 280/124.134 |
| 8,210,551 B2 * | 7/2012 | Jakob | 280/124.13 |
| 2001/0045719 A1 * | 11/2001 | Smith | 280/124.116 |
| 2004/0046349 A1 * | 3/2004 | Ackley et al. | 280/124.135 |
| 2008/0303234 A1 * | 12/2008 | Mc Cann | 280/93.511 |

* cited by examiner

TRAILER FOR A TRAILER TRUCK

TECHNICAL FIELD AND BACKGROUND OF THE MENTION

The present invention relates to a trailer for a trailer truck.

EP 1 985 474 discloses a semitrailer comprising axles with independent wheel suspension of the double wishbone type. That is, each wheel has a steering knuckle which is connected to the chassis via two A-shaped wheel suspension arms. Each of the wheel suspension arms is pivotally connected to the chassis about a pivot axis that extends in the longitudinal direction of the semitrailer. The advantage of using a wheel suspension of this type with a trailer over using a through axle is that this type of wheel suspension imposes less restrictions on the construction of the chassis, in particular as regards the loading height centrally on the trailer, so that a boom recess, for example, can be recessed deeper in the trailer, as is shown in FIG. 4b of EP 1 985 474. In order to obtain the widest possible boom recess in the aforesaid known semitrailer, the upper A-shaped arms are significantly shorter than the lower A-arms.

A drawback of the wheel suspension of the semitrailer according to EP 1 985 474, however, is the fact that a significant change in the wheel camber occurs upon compression and extension of the suspension. As a result, the wheels only make contact with the road surface via part of their surface area (the part on the inner side), which leads to increased wear and a lower bearing capacity. In addition, a significant transverse displacement of the wheel occurs upon compression and extension of the suspension, which leads to increased tyre wear.

BRIEF SUMMARY OF THE INVENTION

It is an object of the present invention to provide a trailer for a trailer truck which has a compact wheel suspension and in which the above problems of the known semitrailer are eliminated or at least alleviated.

This object is accomplished with the trailer according to the present invention, which is characterised in that the second pivot axis extends at least substantially in the transverse direction of the chassis, with the second end of the second wheel suspension being spaced from the first end of the second wheel suspension arm, seen in the longitudinal direction of the chassis. The phrase "substantially in the transverse direction" is understood to mean that the second pivot axis extends at an angle of at most 15 degrees relative to the transverse direction. The same angle obtains as regards the first pivot axis relative to the longitudinal direction of the chassis.

An advantage of the trailer according to the present invention is the fact that by using a second pivot axis of the second wheel suspension arm that extends in the transverse direction of the trailer chassis (i.e. transversely to the driving direction in use), wherein the second end of the second wheel suspension arm is spaced from the first end of the second wheel suspension arm, seen in the longitudinal direction of the chassis, the length of the second wheel suspension arm can be increased without this resulting in a decrease of the useful load space. As a result, the wheel camber change upon compression and extension of the wheel suspension caused by the load on the trailer is significantly reduced. In addition, this leads to an increased load capacity of the trailer. Furthermore, the extent of tyre wear is significantly smaller as a result of the aforesaid reduced wheel camber change and also of the reduced transverse displacement of the steering knuckle upon compression and extension. Because the second end of the second wheel suspension arm is spaced from the first end of the second wheel suspension arm, seen in the longitudinal direction of the chassis, and because the second wheel suspension arm can thus be oriented substantially in the longitudinal direction of the chassis of the trailer, a boom recess that may be formed in the chassis as a central chassis element can have a greater width. The range of uses of the trailer is thus significantly increased. Alternatively, the dimension of a central box girder as a central chassis element of the chassis can be increased, which, given an unchanged degree of stiffness, will lead to a lighter chassis design.

Within the framework of the present invention, the word "wheel" is understood to mean an individual wheel which forms part of a an individual wheel suspension (so-called "single wheel"), or a set of two or more wheels mounted on the same wheel axle, which are connected to an individual wheel suspension (so-called "twin wheels"). Within the framework of the present invention, the term "trailer" is in any case understood to mean a trailer fitted with a trailer tongue as well as a semi-trailer fitted with a coupling pin for being coupled to a turntable present on the tractor.

Preferably, the chassis also comprises bottom plates disposed above the wheel suspension, which extend on either side of the central chassis element.

In an advantageous embodiment, the second wheel suspension arm extends substantially rearwards from the steering knuckle.

The first pivot axis preferably extends at an angle of at most 10 degrees relative to the longitudinal direction of the chassis, and/or the second pivot axis extends at an angle of at most 10 degrees relative to the transverse direction of the chassis.

In a simple preferred embodiment, the steering knuckle is connected to the first wheel suspension arm and the second wheel suspension arm by means of respective ball joints.

It is furthermore advantageous if the wheel suspension further comprises spring means for allowing springing movement of the wheel relative to the chassis in use, which spring means extend substantially in vertical direction between a position near the second end of the first wheel suspension arm and the chassis.

A very stable construction is realised if the first wheel suspension arm and/or the second wheel suspension arm comprise(s) at least two hinges disposed spaced from each other, in line with the respective first or second pivot axis, at the first end thereof for connection of the wheel suspension arm to the chassis.

In a robust preferred embodiment, the first and/or the second wheel suspension arm, preferably both, is (are) at least substantially Y-shaped, wherein a hinge is provided at the free end of each of the two diverging legs of the Y-shape that form the first end of the wheel suspension arm, and wherein the wheel suspension arm is connected to the steering knuckle at the free end of the opposite single leg that forms the second end.

To realise a large steering angle it is furthermore advantageous if the second wheel suspension arm is at least substantially Y-shaped, wherein the single leg extends at an oblique angle from the second end toward the chassis, seen in top plan view, wherein at least one of the two diverging legs extends at least substantially at an oblique angle away from the chassis, seen in top plan view.

In a simple preferred embodiment, the steering knuckle is configured as one elongated part.

A further space-saving, seen in the transverse direction of the chassis, is realised if the wheel axle and the steering knuckle are formed as one integral part.

It is furthermore advantageous if the wheel suspension comprises a steering rod connected to the steering knuckle for pivoting the steering knuckle about a vertical pivot axis. The steering rod may be connected to a steering system of the trailer, so that the angular position of the wheel can be adjusted, for example in dependence on an angle between the trailer and a tractive vehicle. The steering rod can also be used for toe adjustment. The steering rod may also be fixed to the chassis. Thus a rigid axle is created, whilst toe adjustment is still possible by means of the steering rod.

Quite preferably, the steering knuckle is so designed that an upper side of the second end of the second wheel suspension arm is disposed lower than the highest point on the wheel circumference. As a result, the space available for the wheel suspension, seen in vertical direction, is optimally utilised for providing spring travel for the wheel. In case a bottom plate forming part of the chassis is disposed above the wheel suspension, the wheel suspension can compress until the wheel touches, or at least nearly touches, the underside of the bottom plate, without the upper side of the second end of the second wheel suspension arm constituting a limiting factor in this regard. This embodiment is advantageous in particular if the second wheel suspension arm is at least substantially Y-shaped as well, with the single leg extending obliquely from the second end in the direction of the chassis, as described above.

The central chassis element is preferably made up of a central box girder.

Alternatively, the central chassis element comprises an at least substantially U-shaped boom recess.

BRIEF DESCRIPTION OF THE DRAWINGS

The present invention will now be explained in more detail by means of a description of a preferred embodiment of a trailer according to the present invention, in which reference is made to the following figures, in which.

DETAILED DESCRIPTION OF THE INVENTION

Figure 1:
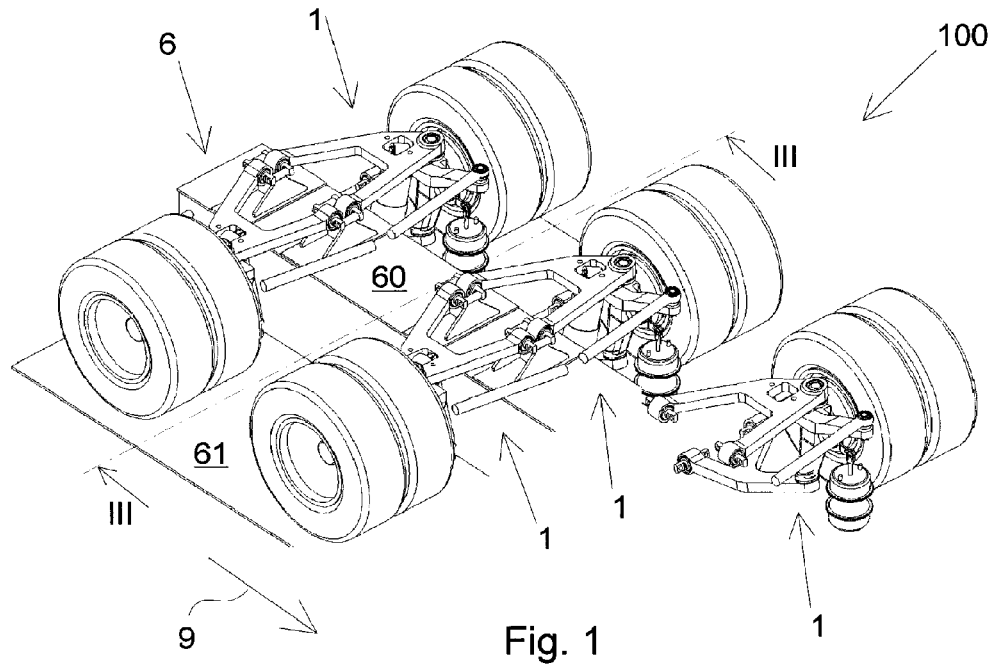
FIG. 1 is a three-dimensional representation of part of a preferred embodiment of a trailer according to the present invention.

FIG. 1 shows a trailer 100 as a preferred embodiment of a trailer according to the present invention. The trailer comprises three steered axles, two being shown in their entirety and one being shown in half. The wheels (twin wheels in the example of FIG. 1) of the trailer are each connected to the chassis 6 by means of a wheel suspension 1. A steering system for steering the wheels is not shown in FIG. 1. The chassis has a central chassis element 60, configured as a central box girder in the example shown in the figures, and bottom plates 61 disposed above the wheel suspensions, which extend laterally from the box girder on either side thereof.

Figure 2:
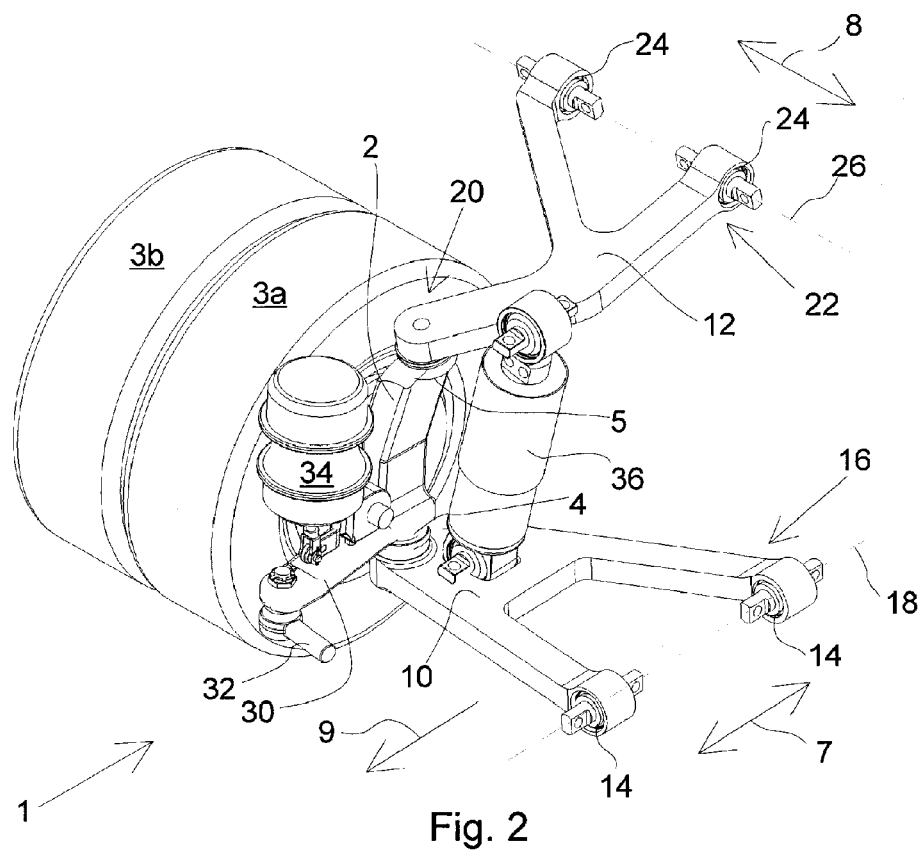
FIG. 2 is a three-dimensional representation of a wheel suspension of the trailer shown in FIG. 1.

In FIG. 2 there is shown a wheel suspension 1 of the semitrailer shown in FIG. 1. The wheel suspension 1 comprises a steering knuckle 2, to which a wheel axle is attached, on which wheels 3a and 3b are rotatably mounted. At its bottom end 4, the steering knuckle 2 is connected to a first, lower wheel suspension arm 10 via a ball joint. At its upper end 5, the steering knuckle 2 is connected to a second, higher wheel suspension arm 12 via a further ball joint.

At a first end 16 thereof, the first wheel suspension arm 10 pivotally connected, about a pivot axis 18 extending in the longitudinal direction 7 of the chassis 6, to the bottom side of the box girder 60 of the chassis by means of two hinges 14. See also FIG. 3. The wheel suspension arm 10 extends from its first end 16 over a distance y substantially in the transverse direction 8 of the chassis 6, being connected to the steering knuckle 2 at the location of the second end 15 located opposite the first end 16 thereof. See also FIGS. 4 and 5.

At the first end 22 thereof, the second wheel suspension arm 12 is pivotally connected, about a pivot axis 26 extending in the transverse direction 8 of the chassis, to the chassis 6, directly under the bottom plate 61, by means of two hinges 24. The wheel suspension arm 12 extends from its first end 22 over a distance x substantially rearwards in the longitudinal direction 7 of the chassis 6, being connected to the steering knuckle 2 at the location of the second end 20 located opposite the first end 22 thereof. The term "rearwards" is understood to mean the opposite direction of the driving direction 9 of the trailer in use.

The wheel suspension 1 further comprises a steering arm 30 attached to the steering knuckle 2, which is connected to a steering rod 32 via a ball joint. In case a steerable version of the wheel suspension 1 is used, the steering rod 32 may be connected to a steering system (not shown), so that the angular position of the steering knuckle 2 relative to a substantially vertical pivot axis can be adjusted for steering the wheels 3a and 3b and for adjusting the wheel camber. In a non-steerable version of the wheel suspension 1, the steering rod 32 is directly connected to the chassis 6, making it possible to adjust the wheel camber, so that in this case the steering rod 32 in fact functions as a fixed steering tie rod.

The wheel suspension also comprises a spring element 36, which is configured as a hydraulic spring element in the embodiment shown in the figures. Alternatively it is also possible to use a pneumatic or a mechanical spring element, for example. Furthermore, a (pneumatic or hydraulic) brake cylinder 34 is provided for actuating a brake drum mounted in the wheel hub or, alternatively, a disc brake. The presence of the aforesaid brake and brake cylinder is not essential within the framework of the present invention.

The wheel suspension arm 10 is substantially A-shaped, comprising a hinge 14 as mentioned above at the end of each of the legs of the A-shape. The wheel suspension arm 12 is substantially Y-shaped. See in particular FIG. 4. From the steering knuckle 2, the wheel suspension arm 12 extends inwards at an obtuse angle with a first part 12a, being the single leg of the Y-shape, and subsequently rearwards with a second part 12b, which forms one of the diverging legs of the Y-shape, substantially in the longitudinal direction 7 of the chassis. The third part 12c, which functions as the second diverging leg of the Y-shape, extends at an angle substantially sideways from the chassis. In the example shown in the figures, the second wheel suspension arm 12 extends substantially rearwards (or in the opposite direction of the driving direction 9), in the longitudinal direction 7 of the chassis. Alternatively, the second wheel suspension arm 12 may also extend substantially forwards, in the longitudinal direction 7 of the chassis.

Figure 4:
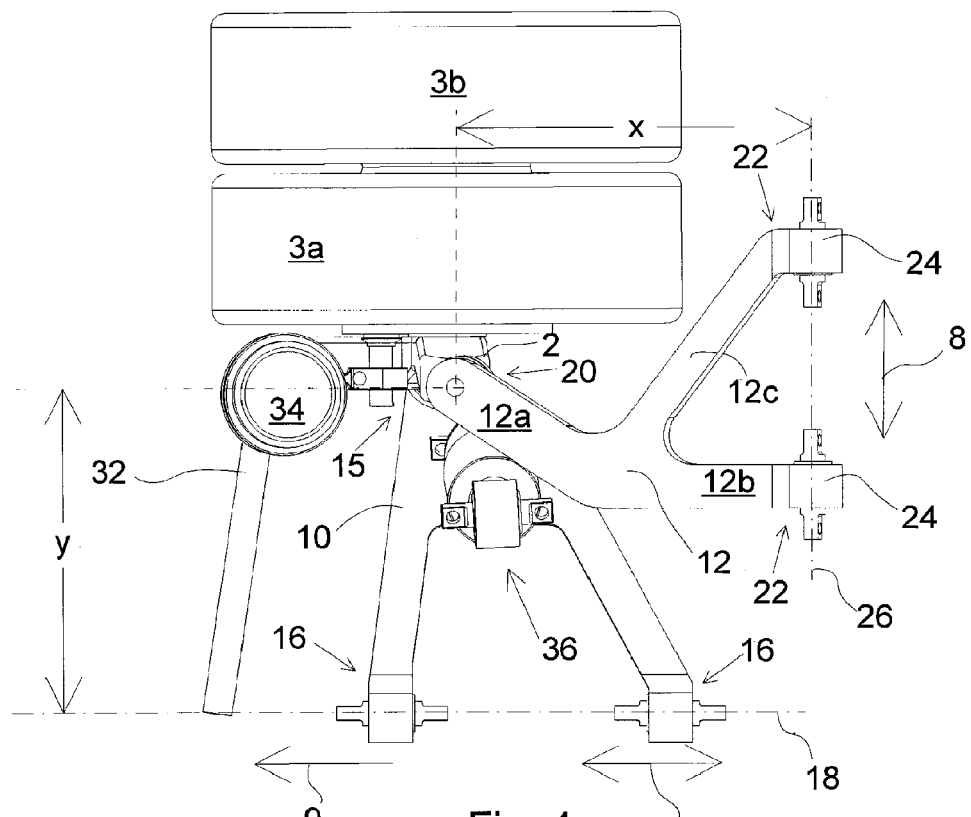
FIG. 4 is a top plan view of the wheel suspension of FIG. 2.

As is shown in particular in the top plan view of FIG. 4, a significant space saving on the inner side of the wheels 3a and 3b is realised by using the above-described construction, so that the space available for cargo, for example a boom recess, will be larger. Alternatively, a larger box girder 61 of the chassis 6 may be used. Advantages of a larger box girder include the fact that this makes it easier to configure the box girder as a multi telescoping box girder, or to realise a lighter construction of the chassis. Instead of using a larger box girder it is also possible to opt for a narrower chassis, thus realising a compact trailer having a relatively high load capacity.

Figure 3:
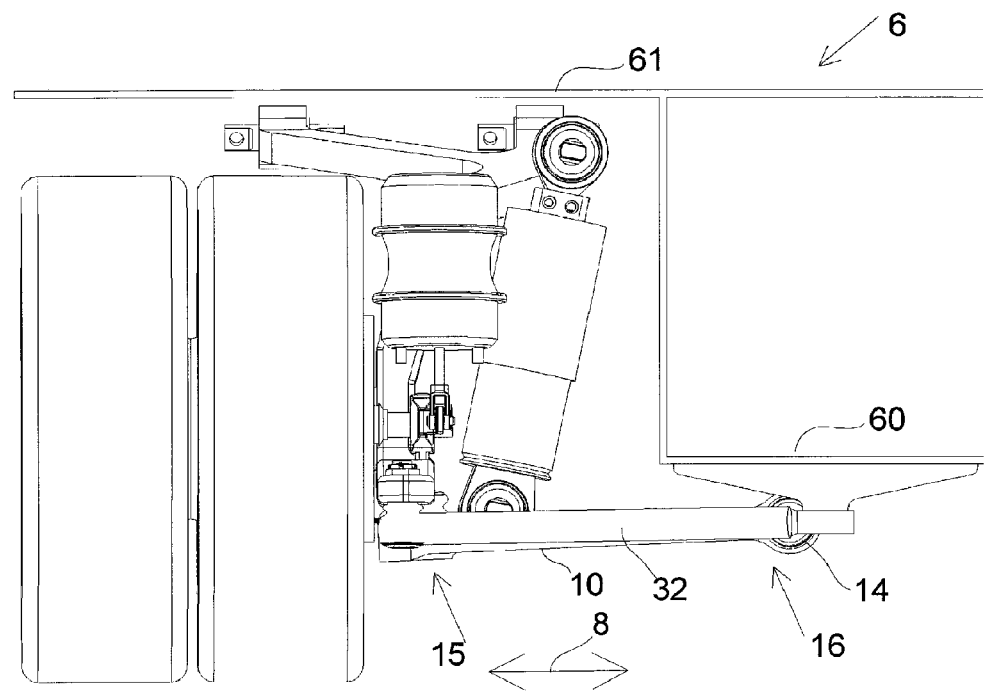
FIG. 3 is a view of part of the section in FIG. 1.
Figure 5:
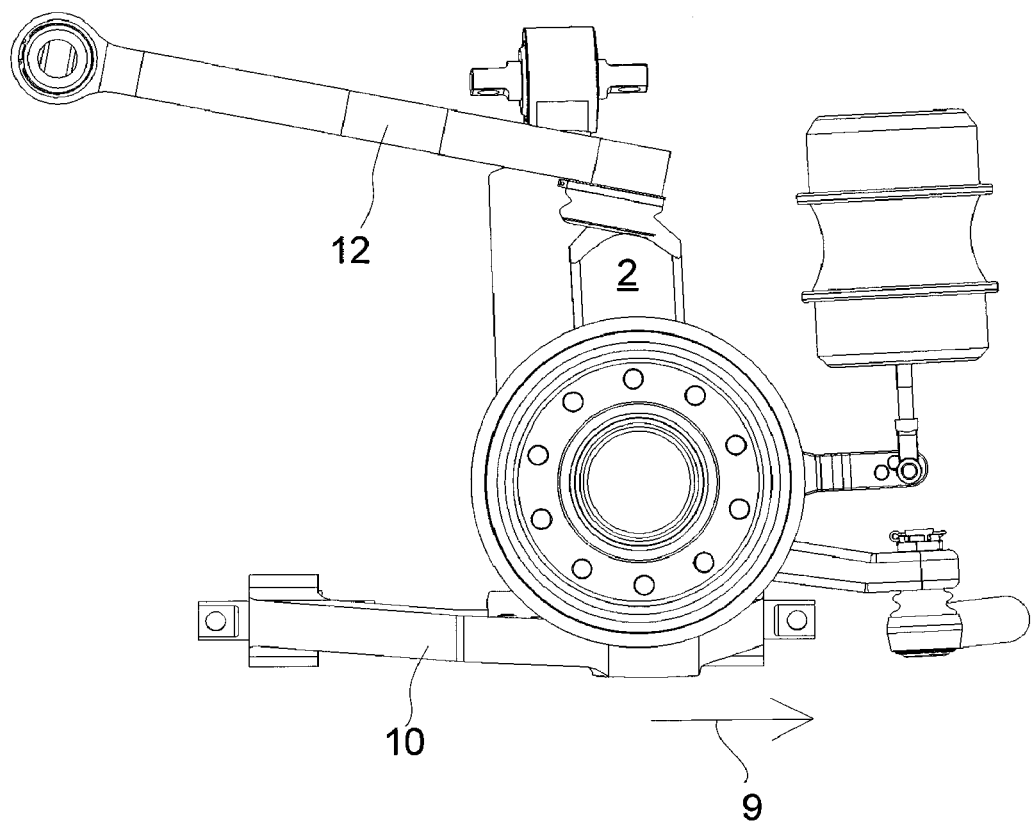
FIG. 5 is a side view of the wheel suspension of FIG. 2.

As appears in particular from FIGS. 3 and 5, an upper side of the second end 20 of the second wheel suspension arm 12 is positioned lower than the highest point on the wheel circumference. As a result, the wheel can move up to a point directly under the bottom plate 61 upon compression of the suspension, without the second wheel suspension arm 12 constituting an impediment in this regard.

The invention claimed is:

1. A trailer for a trailer truck, the trailer comprising;
a chassis comprising a central chassis element: at least one wheel axle with an independent wheel suspension, which is connected to the chassis, the at least one wheel axle for rotatably supporting a wheel mounted thereon; the independent wheel suspension comprising: a first, lower wheel suspension arm having a first end which is pivotally connected to the chassis, under the central chassis element, about a first pivot axis that extends substantially in a longitudinal direction of the chassis, a second, higher wheel suspension arm having a first end which is pivotally connected to the chassis about a second pivot axis that extends substantially in a transverse direction of the chassis, a steering knuckle, which extends between a second end of the first wheel suspension arm and a second end of the second wheel suspension arm, connecting the first wheel suspension arm and the second wheel suspension arm, the second end of the first wheel suspension arm being spaced from the first end of the first wheel suspension arm by a distance (y), as seen in a top plan view of the independent wheel suspension, wherein the at least one wheel axle is attached to the steering knuckle, wherein the second end of the second wheel suspension arm is spaced from the first end of the second wheel suspension arm by a distance (x), as seen in the top plan view of the independent wheel suspension, wherein the second wheel suspension arm comprises at least two hinges spaced from each other, in line with the second pivot axis, at the first end of the second wheel suspension arm for connecting the second wheel suspension arm to the chassis, wherein the second wheel suspension arm is substantially Y-shaped, wherein a hinge of the at least two hinges is provided at a free end of each of two diverging legs of the Y-shape that form the first end of the second wheel suspension arm, wherein the second wheel suspension arm is connected to the steering knuckle at a free end of a single leg of the Y-shape that forms the second end of the second wheel suspension arm, the single leg of the second wheel suspension arm extending at an oblique angle from the second end of the second wheel suspension arm toward the chassis, as seen in the top plan view of the independent wheel suspension, and wherein at least one of the two diverging legs of the second wheel suspension arm extends substantially at an oblique angle away from the chassis, as seen in the top plan view of the independent wheel suspension.

2. The trailer according to claim 1, wherein the first wheel suspension arm comprises at least two hinges spaced from each other, in line with the first pivot axis, at the first end of the first wheel suspension arm for connecting the first wheel suspension arm to the chassis, wherein the first wheel suspension arm is substantially A-shaped, wherein a hinge of the at least two hinges of the first wheel suspension arm is provided at a free end of each of the two angled legs of the A-shaped that form the first end of the first wheel suspension arm, and wherein the first wheel suspension arm is connected to the steering knuckle at the second end of the first wheel suspension arm.

3. The trailer according to claim 1, wherein the second wheel suspension arm extends substantially rearwards from the steering knuckle.

4. The trailer according to claim 1, wherein the first pivot axis extends at an angle of at most 10 degrees relative to the longitudinal direction of the chassis, and/or the second pivot axis extends at an angle of at most 10 degrees relative to the transverse direction of the chassis.

5. The trailer according to claim 1, wherein the steering knuckle is connected to the first wheel suspension arm and the second wheel suspension arm by means of respective ball joints.

6. The trailer according to claim 1, wherein the independent wheel suspension further comprises spring means for allowing springing movement of the wheel relative to the chassis when the trailer is in use, the spring means extending substantially in a vertical direction between a position near the second end of the first wheel suspension arm and the chassis.

7. The trailer according to claim 1, wherein the steering knuckle is configured as one elongated part.

8. The trailer according to claim 1, wherein the at least one wheel axle and the steering knuckle are formed as one integral part.

9. The trailer according to claim 1, wherein the independent wheel suspension further comprises a steering rod connected to the steering knuckle for pivoting the steering knuckle about a vertical pivot axis.

10. The trailer according to claim 1, wherein the steering knuckle is configured such that an upper side of the second end of the second wheel suspension arm is disposed lower than a highest point on a circumference of the wheel.

11. The trailer according to claim 1, wherein the central chassis element is made up of a central box girder.

* * * * *